(12) United States Patent
Ho et al.

(10) Patent No.: US 10,140,007 B2
(45) Date of Patent: Nov. 27, 2018

(54) SMART AUDIENCE PICKER

(71) Applicant: Facebook, Inc., Menlo Park, CA (US)

(72) Inventors: Chieh Ho, Jocelin, CA (US); Shawn Shihang Wei, Sunnyvale, CA (US); Meng Lu, Fremont, CA (US)

(73) Assignee: Facebook, Inc., Menlo Park, CA (US)

( * ) Notice: Subject to any disclaimer, the term of this patent is extended or adjusted under 35 U.S.C. 154(b) by 156 days.

(21) Appl. No.: 15/415,796

(22) Filed: Jan. 25, 2017

(65) Prior Publication Data

US 2018/0210635 A1    Jul. 26, 2018

(51) Int. Cl.
*G06F 3/0484*    (2013.01)
*G06Q 50/00*    (2012.01)
*H04L 29/06*    (2006.01)

(52) U.S. Cl.
CPC ...... *G06F 3/04847* (2013.01); *G06F 3/04842* (2013.01); *G06Q 50/01* (2013.01); *H04L 63/00* (2013.01)

(58) Field of Classification Search
CPC . G06F 3/04847; G06F 3/04842; H04L 67/10; G06Q 50/01; G06Q 50/00
See application file for complete search history.

(56) References Cited

PUBLICATIONS

U.S. Appl. No. 29/591,736 by Ho, C., et al., filed Jan. 23, 2017.

*Primary Examiner* — Jeffrey A Gaffin
*Assistant Examiner* — Bille M Dahir
(74) *Attorney, Agent, or Firm* — Fenwick & West LLP

(57) ABSTRACT

Various embodiments include a graphical user interface for a social network system. The graphical user interface includes a slider for selecting recipients who may receive communications from a user (or sources who may send communications to the user). Various positions of the slider may correspond to or otherwise constrain the size of the communication recipient (or source) set.

20 Claims, 5 Drawing Sheets

SMART AUDIENCE PICKER

BACKGROUND

Social network systems typically provide mechanisms (referred to as channels, e.g., posts, messages, emails, invitations, notifications, newsfeeds, etc.) for members to communicate, directly and indirectly, with one another. End-user devices can access a social network system via dedicated applications or web browsers. For example, a social network system can include client-side applications (e.g., a social network application ("app") executing on a smart phone or other mobile computing device) that receive and respond to user interactions with the social network system. As another example, a social network system may generate dynamic social network website(s) for web browsers to access.

A user of a social network system may transmit or receive communications with respect to a fixed set of other users (e.g., posts on a "wall" to all "friends" of the user). In some cases, a user may manually construct a list or audience for receiving specific communications (e.g., by adding specific user identifiers to a recipient list for certain messages). However, the lack of simplicity and flexibility of efficient control over the selection of communication recipients (or sources) may discourage users from fully engaging in many social network communications.

Figure 1:
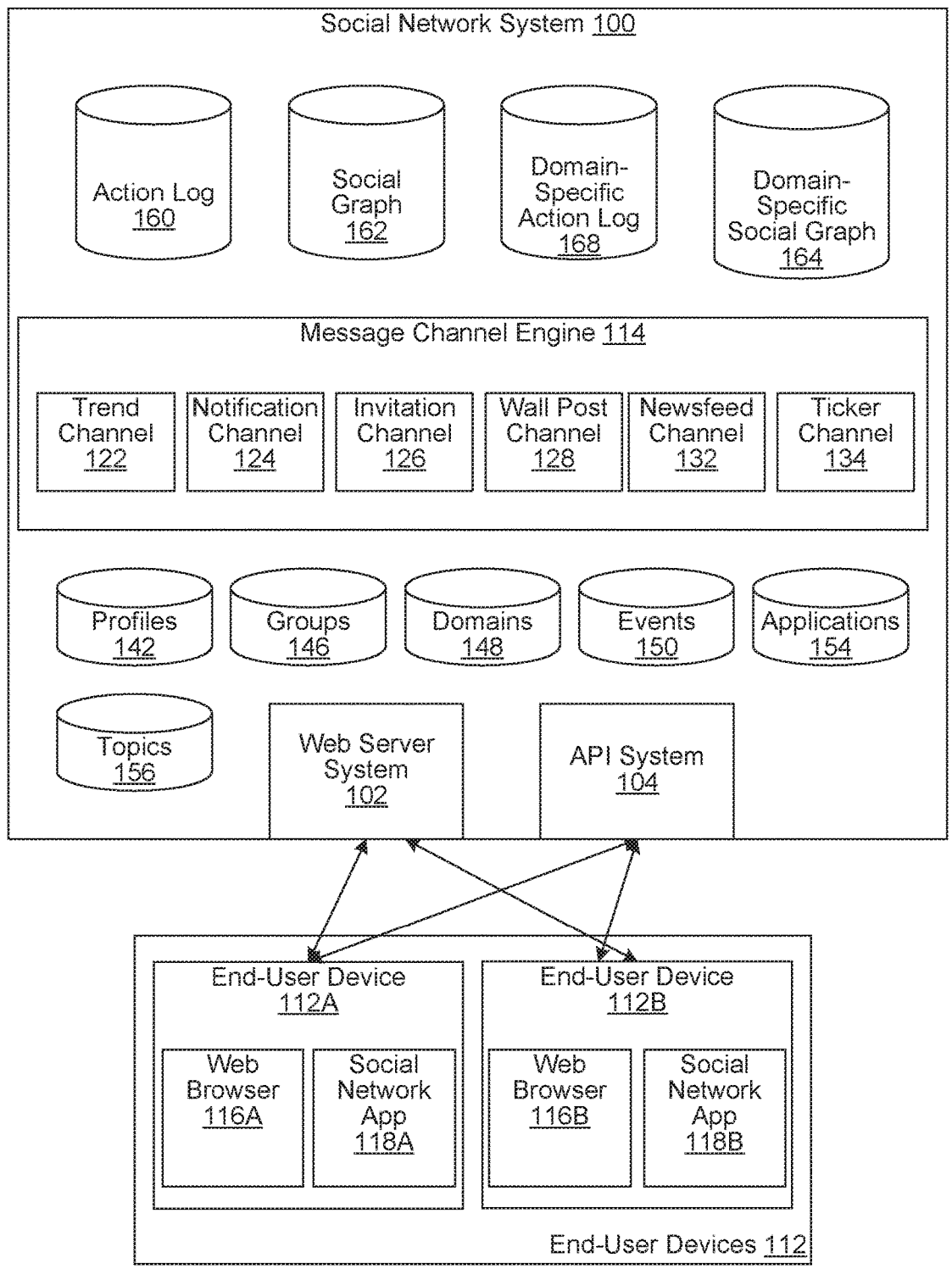
FIG. 1 is a block diagram illustrating a network environment of a social network system, in accordance with various embodiments.

The figures depict various embodiments of this disclosure for purposes of illustration only. One skilled in the art will readily recognize from the following discussion that alternative embodiments of the structures and methods illustrated herein may be employed without departing from the principles of embodiments described herein.

DETAILED DESCRIPTION

Various embodiments are disclosed of a social network system that allows users to control the size or scope of a set of social network users ("audience") with whom communications are exchanged (e.g., shared and/or received). More specifically, a user of the social network system may interact with a graphical user interface (GUI) of a "smart audience picker" to exercise this control. At least some portion of the smart audience picker may be executed in dedicated client-side social network applications, rendered in general-purpose web browsers, or implemented in other applications or executables having access to the social network system.

In some embodiments, the GUI of the smart audience picker may include at least a slider (or track bar) for simple and efficient selection of recipients (or sources). A design application (U.S. patent application Ser. No. 29/591,736) corresponding to some embodiments of ornamental design for the GUI, entitled "GRAPHICAL USER INTERFACE FOR A DISPLAY SCREEN OR PORTION THEREOF," filed on Jan. 23, 2017, is incorporated herein by reference in its entirety. The slider may correspond to a graphical control element with which a user may set a value by moving an indicator, in a horizontal, vertical, curved, circular, or other fashion. In some cases a user may also click on a point on the slider to change the setting. In some embodiments, the slider indicator may be moved among preset positions or locations (e.g., notches or stops on a slider bar) that correspond to different value settings. In other embodiments, the slider indicator may be moved along a continuum between at least two preset positions for more fine-tuned value settings.

Illustratively, prior to, during, or after the composition of content for certain social network communications (e.g., text, photo, video, audio, combination of the same or the like), a user may be presented with the smart audience picker GUI on a display of an associated end-user device. An upper portion of the smart audience GUI may show the slider as described above, while a lower portion of the smart audience GUI may show icons or other identifiers that identify currently selected recipients of the composed communication.

Different positions of the slider can be utilized to control the size or scope of a set of communication recipients. For example, a start position of the slider may correspond to an empty set of recipients and a stop position of the slider may correspond to a complete set of all the "friends" of a user logically located in a social network that is defined, facilitated, or otherwise provided by the social network system. In some cases, any friend of the user can be defined as having a direct link, connection, or edge to the user in a graph representing the social network. A user selected position between the start and stop positions may correspond to a subset of the complete set of all "friends," which may correspond to or be limited to a size (e.g., top 50 friends, top 100 friends, etc.) defined by a value setting of the position. In other words, the recipient set size can be determined as a function of the selected position relative to the start and/or stop positions.

Once a source user selects a position for an indicator of the slider (and thus the size or scope of the recipient set is determined, limited, or otherwise constrained), the smart audience picker determines which target users should be included in the recipient set. This may be achieved by ranking the strength of connections between the source user and other users in a social network and selecting a threshold number of users with strongest connections to the source user. The smart audience picker may perform the ranking locally on the end-user device or request such ranking to be performed remotely by another component of the social network system (e.g., making a remote procedure call to a server of the social network system). Depending on the display layout on the end-user device, the user can be presented with icons or other identifiers that identify at least some users of the currently selected recipient set, for example, in a lower portion of the smart audience picker GUI.

In some embodiments, the lower portion of the smart audience picker GUI is updated in real time or substantially real time (e.g., within a threshold delay), in response to a change of selected indicator positions on the slider. For example, if the source user drags the indicator from a position A corresponding to "top 50 friends" to a position B corresponding to "top 100 friends," the lower portion of the GUI will show addition (e.g., to the top of the recipient list as displayed) of identifiers that identify at least some users belonging to the top 100 friends but not the top 50. If limited by space, the addition of such identifiers may cause certain identifiers previously shown for the top 50 friends to become invisible in the GUI from the current view (without scrolling down).

In some embodiments, the source user may further deselect users from the current recipient set by interacting with the identifiers presented in the lower portion of the smart audience picker GUI (e.g., uncheck certain check-boxes). Once the source user confirms a finalized recipient set (e.g., by clicking on a "Done" button display in the smart audience picker GUI), the source user may proceed to request or instruct the social network system for transmission of the composed communication to the confirmed set of recipients.

Turning now to the figures, FIG. 1 is a block diagram illustrating a network environment of a social network system 100, in accordance with various embodiments. The social network system 100 offers its member accounts (e.g., accounts for users of one or more social networks facilitated by the social network system 100) the ability to communicate and interact with other member accounts. Member accounts can add social connections to a number of other member accounts to whom they desire to be connected in the social network system 100. As used herein, the term "friend" may refer to any other member account to whom a member account has formed a connection, association, or relationship via the social network system 100. Connections may be added explicitly by a member account, for example, the member account selecting a particular other member account to be a friend, or automatically created by the social network system based on common characteristics of the member accounts (e.g., member accounts who are alumni of the same educational institution). Connections in the social network system 100 are usually in both directions, but need not be, so the terms "member account" and "friend" depend on the frame of reference. For example, if a member "Bob" and a member "Jane" are both member accounts and connected to each other in the social network system 100, Bob and Jane, both member accounts, are also each other's friends. The connection between member accounts may be a direct connection; however, in some embodiments, the social network system 100 enables social connections that are indirect via one or more levels of chained connections. Also, the term "friend" need not require that member accounts actually be friends in real life, (which would generally be the case when one of the member accounts is a business or other entity). The term "friend" can imply a social connection tracked in a social graph (e.g., a social graph 162) of the social network system 100.

The member accounts can interact with each other via a web server system 102 or an application programming interface (API) system 104. The web server system 102 can provide application services (e.g., social network services, messaging services, etc.) to end-user devices 112 (e.g., an end-user device 112A, an end-user device 112B, etc., collectively as the "end-user devices 112") when the end-user devices 112 access a social network website hosted by the web server system 102. For example, each of the end-user devices 112 can include and execute a web browser (e.g., a web browser 116A or a web browser 116B). The web browser can communicate with the application services via the web server system 102. The API system 104 can provide the application services to the end-user devices 112 through a dedicated social network application (e.g., a social network app 118A or a social network app 118B) running on an operating system of the end-user devices 112.

There are various mechanisms available to member accounts to communicate with each other or to obtain information that they find interesting (e.g., activities that their friends are involved with, applications that their friends are installing, comments made by friends on activities of other friends, etc.). The mechanisms of communication for member accounts can be referred to as "channels resources." A channel is a computer-mediated communication mechanism for facilitating communication amongst member accounts of the social network system 100 and between the member accounts and the social network system 100.

For example, a message channel engine 114 of the social network system 100 can implement a trend channel 122, a notification channel 124, an invitation channel 126, a wall post channel 128, a newsfeed channel 132, a ticker channel 134, or any combination thereof. The trend channel 122 can provide an open-ended feed of trending social network objects (e.g., social network topics, social network pages, social network events, etc.) from one or more source member accounts to at least a recipient member account. A social network object can be "trending" if a threshold number of activities involving the social network object occurred or are detected within a threshold time. In some embodiments, the message channel engine 114 can configure the trend channel 122 with trending social network objects that are relevant to the member account. For example, relevancy can be determined based on the activities' and/or the social network object's associations with the member account and/or social connections of the member account.

The notification channel 124 can provide an open-ended feed of notifications to at least a member account. A notification can be a message informing the member account that some activities involving the member account have occurred or been detected in the social network system 100. A notification can be a message informing the member account that some activities involving one or more social connections (e.g., other member accounts) of the member account has occurred or been detected in the social network system 100.

The invitation channel 126 can provide an open-ended feed of invitations to at least a member account. An invitation can be a message sent by a member account inviting another member account to do something (e.g., to install an application, to join a group, to join an identity domain, to view or interact with a social network object, to form a social connection, etc.). The wall post channel 128 can provide a list of "wall posts" for at least a member account. An application service of the social network system can implement a "wall" for each member account, enabling other member accounts to write messages on the wall. The wall can serve as a message container and can enable member accounts to share information between social connections (e.g., "friends"). A message written to a member account's wall can be referred to as a "wall post." In some embodiments, a member account can post on its own wall, as well as walls of the member account's social connections.

The newsfeed channel 132 can provide a newsfeed to at least a member account. A "newsfeed" can provide an open-ended stream of activities involving one or more social network connections of the member account. The newsfeed can be updated continuously, periodically, or responsive to occurrences of the activities. Such activities can include a social network connection adding an application, commenting on a social network object (e.g., a photo, an event, a video, etc.), making new friends, etc. In some embodiments, some embodiments, the message channel engine 114 can organize the newsfeed as a list of news stories. Each of the news stories can include an activity by the member account or a social connection of the member account. Each new story can also include a set of related activities (e.g., comments and replies) associated with the primary activity.

The ticker channel 134 can provide a feed of ticker items to at least a member account. A "ticker feed" can provide a list of activities occurring on the social network system 100 that are relevant to the member account. In some embodiments, the ticker feed can be a subset of the newsfeed provided in the newsfeed channel 132. In some embodiments, the ticker feed can include summaries of the activities provided in the newsfeed. For example, whereas a news story in the newsfeed can include one or more media objects and digital chatters (e.g., comments and replies) associated with the news story, each ticker item can include only a description of an actor, a description of an activity, and/or a description of a target social network object.

In addition to interactions with other member accounts, the social network system 100 provides member accounts with the ability to take actions on various types of social network objects supported by the social network website (e.g., provided by the web server system 102). For example, these social network objects can include groups or networks (where "networks" here refer not to physical communication networks, but rather to social networks of people) to which member accounts may belong, events or calendar entries in which a member account might be interested, computer-based applications that a member account may use via the website, and transactions that allow member accounts to buy, sell, auction, rent, or exchange items via the website.

The social network system 100 can maintain a number of passive and/or interactive social network objects. For example, these social network objects can include member account profiles 142, group objects 146, identity domain objects 148, event objects 150, application objects 154, topic objects 156, or any combination thereof. The recorded activities in the social network system 100 can correspond to one or more of these social network objects.

As member accounts of the social network system 100 interact with the social network objects via the web server system 102 or the API system 104, the social network system 100 can store records of these interactions in an action log 160. Each action can be associated with one or more social network objects. The types of actions that a member account may perform in connection with a social network object is defined for each object and can depend on the type of item (e.g., group type, event type, application type, profile type, etc.) represented by the social network object. Described below are a number of examples of particular types of social network objects that may be defined in the social network system 100, as well as a number of actions that can be taken for each object. These social network objects and the actions/activities discussed herein are provided for illustration purposes only, and it can be appreciated that any number of variations and features can be provided in the social network system 100.

The social network system 100 can maintain a member account profile (e.g., one of the member account profiles 142) for each of its member accounts. In some embodiments, the social network system 100 tracks any action that a particular member account takes with respect to another member account. The actions can be tracked in the action log 160 and processed as connections between member accounts represented in the social graph 162. In some embodiments, the tracked actions are associated with each member account's account profile. Actions may include, for example, adding a connection to the other member account, sending a message to the other member account, reading a message from the other member account, viewing content associated with the other member account, attending an event posted by another member account, etc. In addition, a number of actions described below in connection with other social network objects are directed at particular member accounts, so these actions are associated with those member accounts as well. In various embodiments, the tracked actions can be included in one or more of the channel resources provided by the message channel engine 114.

In some embodiments, the group objects 146 can represent groups tracked in the social graph 162 and the action log 160 of the social network system 100. A group can comprise of a plurality of member accounts. For example, a member account may define a group to be a fan club for a particular band. In this example, the social network system 100 can maintain a group for that fan club, which might include information about the band, media content (e.g., songs or music videos) by the band, and discussion boards on which member accounts of the group can comment about the band. Accordingly, member account actions that are possible with respect to a group may include joining the group, viewing the content, listening to songs, watching videos, and posting a message on the discussion board.

The event objects 150 can represent events tracked in the social graph 162 and the action log 160 of the social network system 100. For example, an event can be a birthday party, a conference, a virtual celebration, or a holiday. A member account can create an event object by defining information about an event (e.g., the time and place and a list of invitees). Other member accounts may accept the invitation, comment about the event, post their own content (e.g., pictures from the event), and perform any other actions enabled by the social network system 100 for the event. In various embodiments, the message channel engine 114 can include messages, invitations, updates, etc. from the event to various invitees of the event.

The social network system 100 also enables member accounts to add applications (e.g., application services) to their profiles. These applications can be represented by the application objects 154 tracked in the social graph 162 and the action log 160. The application objects 154 can provide enhanced content and interactivity within the social network system 100. The applications may be provided by the website operator and/or by third party developers. The use of any functionality offered by the applications may thus constitute an action by the member account in connection with the application. In some embodiments, actions can be passive and need not require active participation by a member account. For example, an action of an application subscribed to by the member account can constitute the action of the member account. Applications are generally written as server-side code that is run on servers of the social network system 100. In some embodiments, an application includes client-side code to be executed on a browser or a native application of the social network system 100 running on an end-user device.

In some embodiments, each of the identity domain objects 148 can represent an identity domain. Similar to a group, an identity domain can comprise of a plurality of member accounts that belong in a specialized environment (e.g., enterprise domain). However, unlike a group, a member account in an identity domain can associate with one another utilizing a viewer identifier (e.g., a domain-specific account identifier) different from the user identifier normally associated with the member account. The social network system 100 can maintain a domain-specific social graph 164 for the identity domain that is separate and independent from the social graph 162 that is maintained for other activities tracked within the social network system 100. Similarly, the social network system 100 can maintain a domain-specific action log 168 for the identity domain that is separate and independent from the action log 160.

Figure 2:
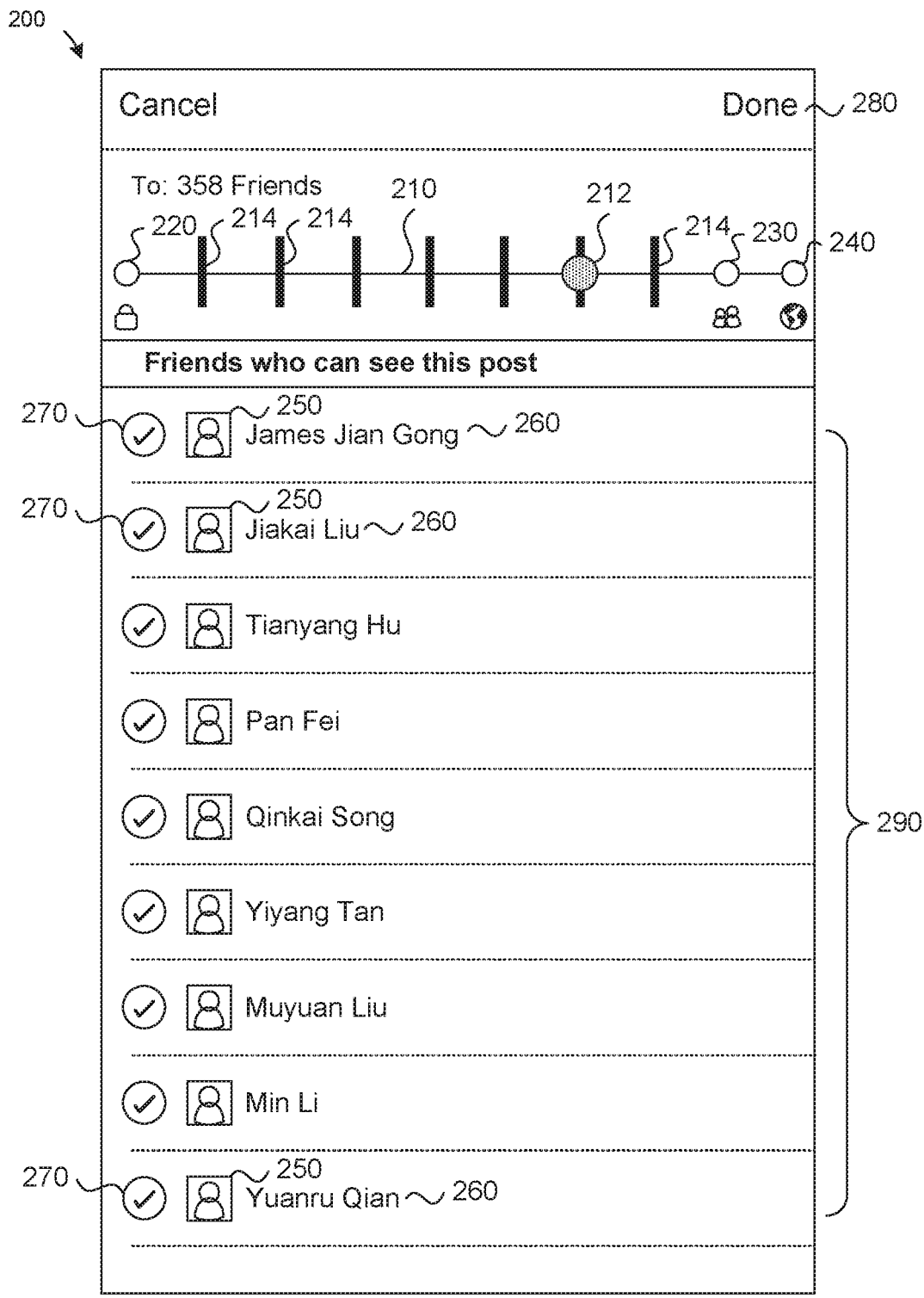
FIG. 2 is an example screenshot of a smart audience picker GUI presented on at least a portion of a display of an end-user device, in accordance with various embodiments.

FIG. 2 is an example screenshot of a smart audience picker GUI 200 presented on at least a portion of a display of an end-user device 112 (e.g., via execution of a social network app 118 or web browser 116), in accordance with various embodiments. FIG. 2 includes ornamental and nonfunctional features in accordance with some embodiments of the smart audience picker GUI; different or additional ornamental and nonfunctional features may be utilized in accordance with other embodiments. The upper portion of the GUI 200 shows a slider 210 (or track bar) for simplistic and efficient selection of recipient member accounts (or source member accounts) of the social network system 100 for various communications, such as communications via any of the channels 122-134. A slider indicator 212 may be moved among preset positions or locations 214 (e.g., notches or stops on a slider bar) that correspond to different value settings. The value setting of a preset position may or may not be explicitly shown in the GUI 200. In some embodiments, the slider indicator 212 may be moved along a continuum between at least two preset positions (e.g. a start position 220 and a stop position 230) for more fine-tuned value settings.

Different positions of the slider 210 can be utilized to control the size or scope of a set of communication recipients (or communication sources) with respect to a particular member account. For example, the start position 220 of the slider may correspond to an empty set of recipients (or sources) and a stop position 230 may correspond to a complete set of all the friends of the particular member account. A user selected position (e.g., where the slider indicator 212 is located) between the start and the stop positions may correspond to a subset of the complete set of all friends, which may correspond to or be limited to a size (e.g., a set of 358 friends as displayed in the upper portion of the GUI 200) defined by a value setting of the selected position. In other words, the recipient/source set size can be determined as a function of the selected position relative to the start and/or stop positions (e.g., based on ratio of distances between the user selected position and preset position(s)).

In some embodiments, the slider 210 may include additional preset positions outside the range defined by the start position 220 and stop position 230. An additional preset position may correspond to a set of users or entities having other relationship(s) with the particular account member than "friendship" as defined by the social network system 100. For example, an additional preset position 240 may correspond to a complete set of all member accounts of the social network system 100 or a complete set of any users or entities having access to the Internet. The start, stop, or any additional preset positions may be associated with a respective icon bearing some meaning to the specific recipient/source set that they each correspond to.

With continued reference to FIG. 2, the lower portion of the GUI 200 displays a list 290 of icons 250 (e.g., thumbnail photos of users) and other identifiers 260 (e.g., names of users) that identify at least some member accounts of the currently selected recipient/source set. In some embodiments, the lower portion of the GUI 200 is updated in real time or substantially real time (e.g., within a threshold delay), in response to a change of selected indicator positions on the slider 210. For example, if a user drags the slider indicator 212 from a position A corresponding to "top 50 friends" to a position B corresponding to "top 100 friends," the upper portion of the GUI 200 may show a corresponding change of displayed recipient/source set size, while the lower portion of the GUI 200 may show addition of icons and other identifiers (e.g., adding to the top of the list 290) that identify at least some member accounts belonging to the top 100 friends but not the top 50. If limited by space, the addition of such new information may cause certain icons and other identifiers previously shown for the top 50 friends to become invisible in the GUI 200 in a current view (without scrolling down or switching pages). In some embodiments, a user may further de-select members (e.g., by unchecking one or more checkboxes 270 in the list 290) from the currently identified recipient/source set. Once the user confirms a finalized recipient/source set (e.g., by clicking on a "Done" button 280), the user may be presented with another GUI for communicating to the confirmed set of recipients (or for receiving communication from the confirmed set of sources).

Figure 3:
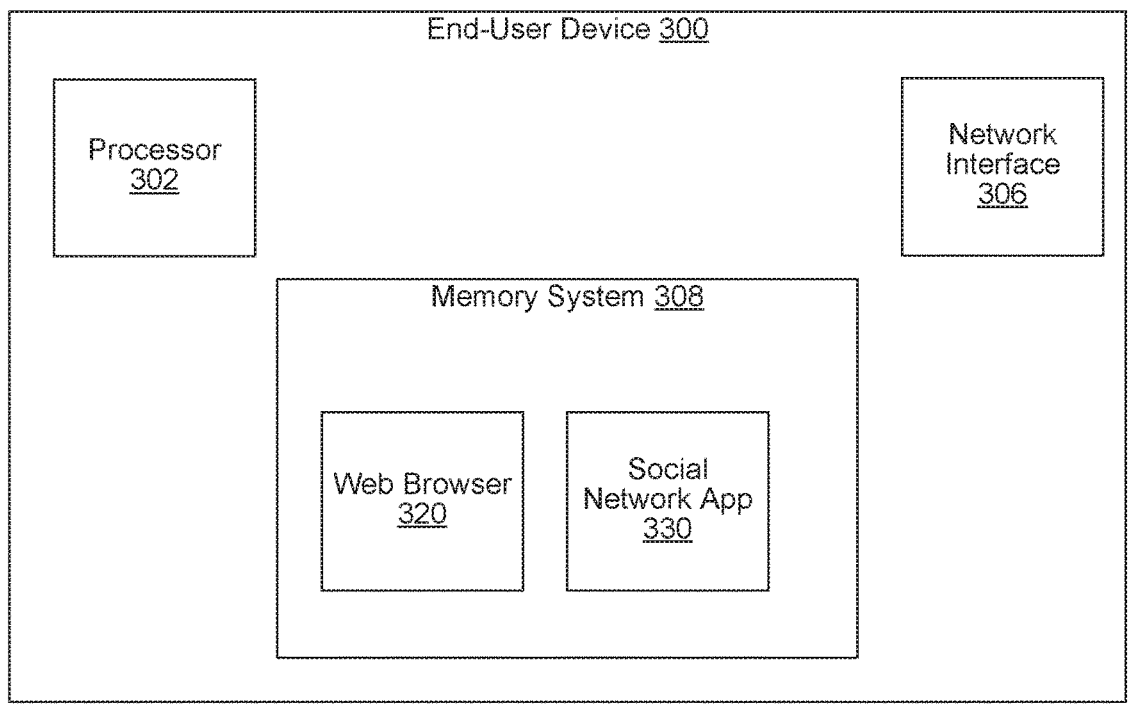
FIG. 3 is a block diagram illustrating an end-user device capable of accessing a social network system via a dedicated social network application or web browser, in accordance with various embodiments.

FIG. 3 is a block diagram illustrating an end-user device 300 capable of accessing a social network system (e.g., the social network system 100) via a dedicated social network application (e.g., a social network app 118) or web browser (e.g., a web browser 116), in accordance with various embodiments. The end-user device 300 can include a processor 302, a network interface 306, and a memory system 308. The network interface 306 can be configured to communicate with external devices over a local area network or a wide area network. For example, the network interface 306 can communicate with a social network system (e.g., the social network system 100).

The memory system 308 can include one or more non-volatile memory components, volatile memory components, or a combination thereof. The memory system 308 can store executable instructions to implement a web browser 320 or a dedicated social network app 330. The web browser 320 or social network app 330 is operable on the end-user device 300 when the executable instructions are executed by the processor 302.

In some embodiments, the web browser 320 can establish a network connection to a web server (e.g., the web server system 102) of the social network system. The web server system can provide a webpage, including client-side executable scripts, to the web browser 320 for presenting a smart audience picker GUI (e.g., the GUI 200) on the end-user device 300 and responding to user interactions with the GUI. As such, the web browser 320 functionally implements the smart audience picker. In some embodiments, the client-side executable scripts can enable the web browser 320 to communicate with a smart audience picker engine (e.g., a smart audience picker engine 400 of FIG. 4 as described below) of the social network system for identification of members of a communication recipient (or source) set as discussed herein.

In some embodiments, the social network app 330 may generate and present a smart audience picker GUI (e.g., the GUI 200) and respond to user interactions locally on the end-user device 112. Alternatively or in addition, the social network app 330 can establish a network connection to an interface server (e.g., the API system 104) of the social network system for retrieval of executable code corresponding to at least some portion of the GUI for execution on the end-user device 300. As such, the social network app 330 implements the smart audience picker. In some embodiments, the social network app 330 may communicate with a smart audience picker engine (e.g., a smart audience picker engine 400 of FIG. 4 as described below) of the social network system for identification of members of a communication recipient (or source) set as discussed herein.

Figure 4:
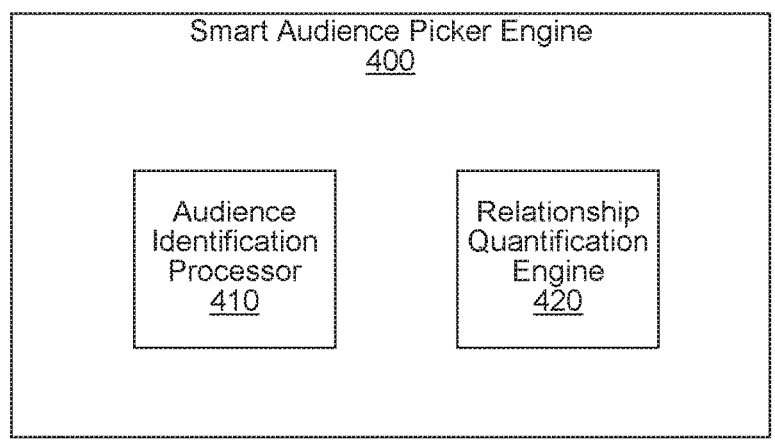
FIG. 4 is a block diagram illustrating a smart audience picker engine in a social network system, in accordance with various embodiments.

FIG. 4 is a block diagram illustrating a smart audience picker engine 400 in a social network system (e.g., the social network system 100), in accordance with various embodiments. The smart audience picker engine 400 can be implemented at least partially in a web server system (e.g., the web server system 102) of the social network system. The smart audience picker engine 400 can also be implemented at least partially in an API system (e.g., the API system 104) of the social network system. The smart audience picker engine 400 can include an audience identification processor 410 and a relationship quantification engine 420.

The audience identification processor 410 can be configured to receive and respond to requests sent from a smart audience picker implemented on an end-user device (e.g., the end-user device 112) for identification of recipients or sources for communication. The requests may specify a type of communication channel, at least some portion of the communication content, a particular member account that intends to send or receive communications, and a size or other threshold criterion for identifying recipients or sources for the intended communication. The audience identification processor 410 may then evaluate relationships (e.g., friendship) between individual member accounts of the social network system and the particular member account, with respect to the communication channel and content included in the request.

To perform the evaluation of relationships, the audience identification processor 410 may request the relationship quantification engine 420 to calculate a quantifiable measure (e.g., in scalar or vector form) of a respective relationship between the particular member account and each candidate member account (e.g., each friend of the particular member account). The relationship quantification engine 420 may calculate the quantifiable measure based on historical factors including past interactions with social network objects, past communications (e.g., frequency, quantity, channel, or quality thereof), relative positions in a social graph, combination of the same or the like, that involve both the particular member account and a candidate member account. Such historical factors can be retrieved or derived from various components of the social network system 100 as shown in FIG. 1. The calculation may also include weighting based on an association or correlation between any of the historical factors and the communication channel/content as indicated in the identification request.

Once the audience identification processor 410 obtains quantifiable measures of relationships between the particular member account and different candidate member accounts, the audience identification processor 410 may rank or order the candidate member accounts based on their respective quantifiable measures of relationship with the particular member account. The audience identification processor 410 may select a threshold number of top candidates in accordance with the ranking, based on the size or other threshold criterion indicated in the identification. The audience identification process may then return to requestor end-user device an indication of the selected top candidates (e.g., icons, aliases, names, pictures, or other identifiers).

Functional/logic components (e.g., applications, engines, modules, and databases) associated with the social network system 100 can be implemented as circuitry, firmware, software, or other functional instructions. For example, the functional/logic components can be implemented in the form of special-purpose circuitry, in the form of one or more appropriately programmed processors, a single board chip, a field programmable gate array, a network-capable computing device, a virtual machine, a cloud computing environment, or any combination thereof. For example, the functional/logic components described can be implemented as instructions on a tangible storage memory capable of being executed by a processor or other integrated circuit chip. The tangible storage memory may be volatile or non-volatile memory. In some embodiments, the volatile memory may be considered "non-transitory" in the sense that it is not a transitory signal. Memory space and storages described in the figures can be implemented with the tangible storage memory as well, including volatile or non-volatile memory.

Each of the functional/logic components may operate individually and independently of other functional/logic components. Some or all of the functional/logic components may be executed on the same host device or on separate devices. The separate devices can be coupled through one or more communication channels (e.g., wireless or wired channel) to coordinate their operations. Some or all of the functional/logic components may be combined as one component. A single functional/logic component may be divided into sub-components, each sub-component performing separate method step or method steps of the single component.

In some embodiments, at least some of the functional/logic components share access to a memory space. For example, one functional/logic component may access data accessed by or transformed by another functional/logic component. The functional/logic components may be considered "coupled" to one another if they share a physical connection or a virtual connection, directly or indirectly, allowing data accessed or modified by one functional/logic component to be accessed in another functional/logic component. In some embodiments, at least some of the functional/logic components can be upgraded or modified remotely (e.g., by reconfiguring executable instructions that implements a portion of the functional/logic components). The systems, engines, or devices described may include additional, fewer, or different functional/logic components for various applications.

Figure 5:
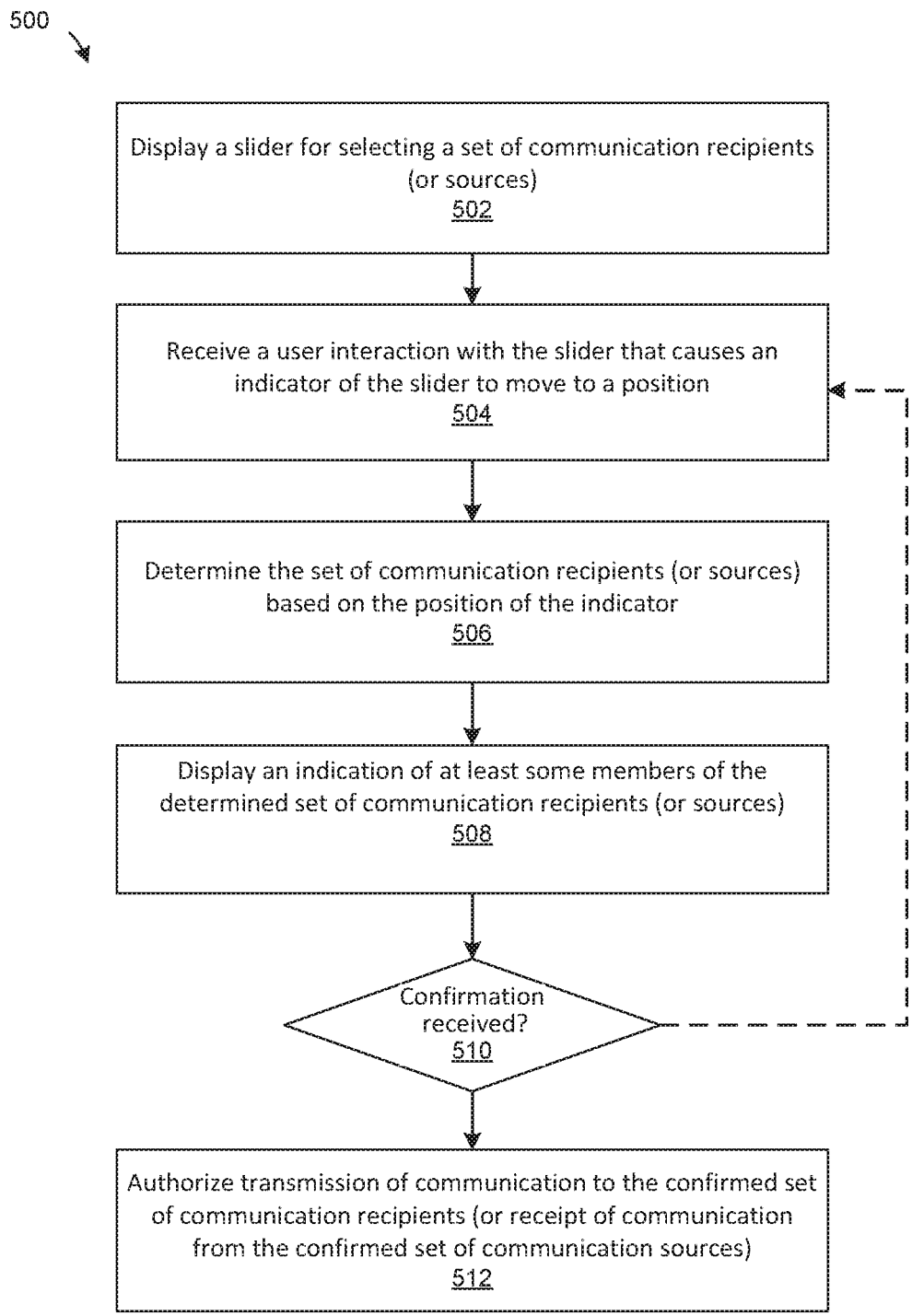
FIG. 5 is a flow diagram illustrating a method for selecting a set of communication recipients (or communication sources) for a particular account member of a social network system, in accordance with various embodiments.

FIG. 5 is a flow diagram illustrating a method 500 for selecting a set of communication recipients (or communication sources) for a particular account member of a social network system (e.g., the social network system 100), in accordance with various embodiments. Illustratively, the method 500 may be performed by a smart audience picker (e.g., as implemented by a dedicated social network app 118 or a web browser 116) and other applicable components of the social network system. At block 502, the smart audience picker displays a slider for selecting a set of communication recipients (or sources). The smart audience picker may display the slider in a GUI (e.g., the GUI 200) for selection of member accounts that may receive communication from the particular account member (or source member accounts that may send communication to the particular account member). The communication can take various forms, such as communications via any of the channels 122-134. A slider indicator (e.g., the slider indicator 212) may be moved among preset positions or locations that correspond to different value settings. The value setting of a preset position may or may not be explicitly shown on the slider. In some embodiments, the slider indicator may be moved along a continuum between at least two preset positions for more fine-tuned value settings.

At block 504, the smart audience picker receives a user interaction (e.g., a mouse click or drag, a finger touch or drag, or a keyboard stroke) with the slider that causes the slider indicator to move to a position. Different positions of the slider can be utilized to control the size or scope of a set of communication recipients (or sources) with respect to the particular member account. A user selected position (e.g., where the slider indicator is located) may be associated with a value (e.g., an integer, percentage, proportion, or other quantifiers) that equals or bounds the size of the communication recipient (source) set. In some embodiments, the value may be calculated by the smart audience picker based on a ratio of distances as defined by the user selected position and one or more preset position(s) of the slider.

At block 506, the smart audience picker determines members of the set of communication recipients (or sources) based at least in part on the position of the slider indicator. The smart audience picker may communicate with a smart audience picker engine (e.g., the smart audience picker engine 400) of the social network system for identification of members of the communication recipient (or source) set. Illustratively, the smart audience picker may transmit an identification request to the smart audience picker engine. The identification request may specify a type of communication channel, at least some portion of the communication content, indication of the particular member account that intends to send or receive communication, and a size or other threshold criterion as determined at block 504 for identifying recipients or sources for the intended communication. The smart audience picker engine may then evaluate relationships between individual member accounts of the social network system and the particular member account, with respect to the communication channel and content included in the request. The smart audience picker engine may then return indication(s) of members included in the communication recipient (source) set (e.g., icons, aliases, names, pictures, or other identifiers) to the smart audience picker. In some embodiments, the smart audience picker may perform at least some (or all) functionalities of the smart audience picker engine by communicating with other components of the social network system.

At block 508, the smart audience picker displays indication(s) of at least some members of the determined set of communication recipients (or sources). The smart audience picker may display, at a lower portion of the GUI, a list (e.g., list 290) of identifiers (e.g., photos, icons, names, aliases, etc.) that identify at least some member accounts of the communication recipient (source) set. A user may need to scroll down from a current view in the lower option to view a complete list of members in the communication recipient (source) set. Each row of the list may be associated with a control icon (e.g., a check box) for a user to further remove one or more members from the communication recipient (source) set. As discussed above, in some embodiments, the lower portion of the GUI is updated in real time or substantially real time (e.g., within a threshold delay), in response to a change of slider indicator position.

At block 510, the smart audience picker determines whether a confirmation of the set of communication recipients (or sources) has been received. As discussed above, the smart audience picker may receive user commands (e.g., unchecking a check box) to remove members from the communication recipient (source) set. The smart audience picker may further receive a user confirmation command, such as a click on a "Done" button displayed on the GUI, that confirms the final makeup of the communication recipient (source) set. If the confirmation command is not received, the method 500 may proceed to block 504, where the smart audience picker receives another user interaction with the slider that causes the slider indicator to move to a new position.

If the smart audience picker receives the confirmation command, at block 512, the smart audience picker authorizes transmission of communication to the confirmed set of communication recipients (or reception of communication from the confirmed set of communication sources). Illustratively, the smart audience picker may present another GUI for the particular member account to compose and transmit communications to the confirmed set of recipients (or to receive communications from the confirmed set of sources).

While processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. In addition, while processes or blocks are at times shown as being performed in series, these processes or blocks may instead be performed in parallel, or may be performed at different times. When a process or step is "based on" a value or a computation, the process or step should be interpreted as based at least on that value or that computation.

Figure 6:
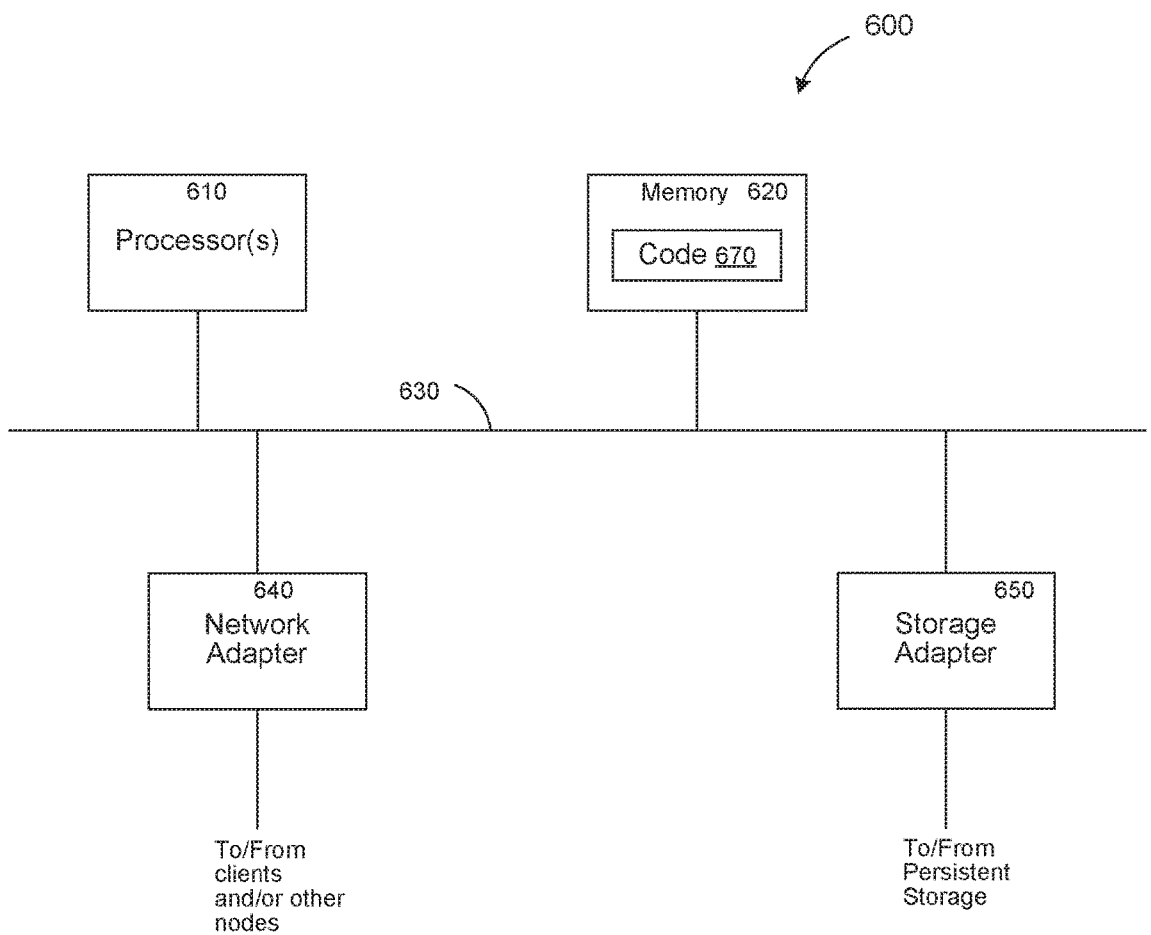
FIG. 6 is a block diagram illustrating an example of a computing device in a social network system, in accordance with various embodiments.

FIG. 6 is a block diagram illustrating an example of a computing device 600 in a social network system (e.g., the social network system 100), in accordance with various embodiments. For example, the computing device 600 can represent one or more computing devices in the social network system 100, and/or methods and processes described in this disclosure. The computing device 600 includes one or more processors 610 and memory 620 coupled to an interconnect 630. The interconnect 630 is an abstraction that represents any one or more separate physical buses, point-to-point connections, or both connected by appropriate bridges, adapters, or controllers. The interconnect 630, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or a "Firewire".

The processor(s) 610 is/are the central processing unit (CPU) of the computing device 600 and thus controls the overall operation of the computing device 600. In certain embodiments, the processor(s) 610 accomplishes this by executing software or firmware stored in memory 620. The processor(s) 610 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 620 is or includes the main memory of the computing device 600. The memory 620 represents any form of random access memory (RAM), read-only memory (ROM), flash memory, or the like, or a combination of such devices. In use, the memory 620 may contain a code 670 containing instructions according to the systems or methods disclosed herein.

Also connected to the processor(s) 610 through the interconnect 630 are a network adapter 640 and a storage adapter 650. The network adapter 640 provides the computing device 600 with the ability to communicate with remote devices (e.g., amongst devices, components, and/or systems described in FIGS. 1-6), over a network and may be, for example, an Ethernet adapter or Fibre Channel adapter. The network adapter 640 may also provide the computing device 600 with the ability to communicate with other computers. The storage adapter 650 enables the computing device 600 to access a persistent storage, and may be, for example, a Fibre Channel adapter or SCSI adapter.

The code 670 stored in memory 620 may be implemented as software and/or firmware to program the processor(s) 610 to carry out actions described above. In certain embodiments, such software or firmware may be initially provided to the computing device 600 by downloading it from a remote system through the computing device 600 (e.g., via network adapter 640).

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium," as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

The term "logic," as used herein, can include, for example, programmable circuitry programmed with specific software and/or firmware, special-purpose hardwired circuitry, or a combination thereof.

Some embodiments of the disclosure have other aspects, elements, features, and steps in addition to or in place of what is described above. These potential additions and replacements are described throughout the rest of the specification. Reference in this specification to "various embodiments," "certain embodiments," or "some embodiments" means that a particular feature, structure, or characteristic described in connection with the embodiment is included in at least one embodiment of the disclosure. These embodiments, even alternative embodiments (e.g., referenced as "other embodiments") are not mutually exclusive of other embodiments. Moreover, various features are described which may be exhibited by some embodiments and not by others. Similarly, various requirements are described which may be requirements for some embodiments but not other embodiments.

What is claimed is:

1. A computer-implemented method, comprising:
   displaying, to a source user, a user interface for social network communication with target users, wherein the user interface comprises a slider for selecting target users;
   receiving, from the source user, an interaction with the slider that causes an indicator of the slider to move from a first position to a second position, wherein the first position corresponds to a first set of target users and the second position corresponds to a second set of target users, and wherein the first set and second set have different numbers of target users;
   in response to receiving the interaction with the slider:
      identifying the second set of target users based, at least in part, on a threshold on a quantifiable measure of a relationship between the source user and selected target users of a third set of target users, wherein the threshold is determined in accordance with the second position; and
      displaying an indication of at least one target user that is included in the second set and excluded from the first set; and
   in response to receiving a confirmation from the source user, authorizing the social network communication between the source user and the second set of target users.

2. The method of claim 1, wherein the interaction with the slider comprises at least one of a mouse, finger, or keyboard interaction.

3. The method of claim 1, further comprising displaying, in a first portion of the user interface, an indication of the number of target users of the first set when the slider is located at the first position.

4. The method of claim 3, further comprising replacing, in the first portion of the user interface, the indication of the number of target users of the first set with an indication of the number of target users of the second set when the slider is moved to the second position.

5. The method of claim 1, further comprising displaying, in a second portion of the user interface, a first list of identifiers that identify at least a subset of the first set of target users, when the slider is located at the first position.

6. The method of claim 5, further comprising replacing, in the second portion of the user interface, the first list of identifiers with a second list of identifiers that identify at least a subset of the second set of target users, when the slider is moved to the second position.

7. The method of claim 6, wherein the indication of the at least one target user that is included in the second set and excluded from the first set corresponds to at least one identifier in the second list.

8. A non-transitory computer-readable medium storing computer-executable instructions that, when executed by one or more processors, cause the one or more processors to perform operations, the operations comprising:
   receiving a first interaction with a slider, the slider presented on a user interface for social network communication between a source entity and target entities;
   in response to receiving the first interaction:
      causing an indicator of the slider to move from a first position to a second position, wherein the first position corresponds to a first set of target entities and the second position corresponds to a second set of target entities, and wherein the first set and second set have different numbers of target entities;

identifying the second set of target entities based, at least in part, on a threshold value corresponding to the second position; and presenting an indication of at least one target entity that is included in the second set and excluded from the first set; and in response to receiving a confirmation, authorizing the social network communication between the source entity and the second set of target entities.

9. The computer-readable medium of claim 8, wherein the indicator of the slider is movable among a plurality of predefined positions including the first and second positions.

10. The computer-readable medium of claim 8, wherein causing the indicator of the slider to move from a first position to a second position comprises causing the indicator of the slider to move along a portion of a continuum between a start position and an end position.

11. The computer-readable medium of claim 10, wherein the start position corresponds to an empty set of target entities.

12. The computer-readable medium of claim 10, wherein the end position corresponds to a complete set of target entities that are connected with the source entity in a social network.

13. The computer-readable medium of claim 12, wherein the indicator of the slider is movable between the end position and a terminal position outside the continuum and wherein the terminal position corresponds to a complete set of entities in the social network regardless of any connection between the source and target entities.

14. The computer-readable medium of claim 8, wherein the operations further comprise receiving a second interaction with the slider.

15. The computer-readable medium of claim 14, wherein the operations further comprise in response to receiving the second interaction:

causing the indicator of the slider to move from the second position to a third position, wherein the third position corresponds to a third set of target entities, and wherein the first set, second set, and third set have different numbers of target entities.

16. A system, comprising:
one or more processors;
a memory configured to store a set of instructions, which when executed by the one or more processors cause the system to:
receive an interaction with a control icon, the control icon presented on a first user interface for selecting users for communication;
in response to receiving the interaction:
cause the control icon to move from a first position to a second position, wherein the first position corresponds to a first set of users and the second position corresponds to a second set of users, and wherein the first set and second set have different numbers of users;
identify the second set of user based, at least in part, on the second position of the control icon relative to a start position; and
present a plurality of identifiers that identify at least a subset of the second set of users; and
in response to receiving a confirmation of users in the second set, authorizing the communication to or from confirmed users of the second set.

17. The system of claim 16, wherein the plurality of identifiers comprises at least one of a photo, name, or alias.

18. The system of claim 16, wherein the set of instructions, which when executed by the one or more processors further cause the system to receive a command to remove a user from the second set.

19. The system of claim 18, wherein the command to remove a user corresponds to a de-selection of an identifier from the plurality of identifiers.

20. The system of claim 15, wherein the set of instructions, which when executed by the one or more processors, further cause the system to present a second user interface for communication to or from the confirmed users of the second set.

* * * * *